United States Patent
Ichihara et al.

(10) Patent No.: US 7,556,871 B2
(45) Date of Patent: Jul. 7, 2009

(54) MAGNETIC RECORDING MEDIUM CONTAINING FIRST AND SECOND RECORDING LAYERS, EACH LAYER CONTAINING A COLUMNAR STRUCTURE

(75) Inventors: Takayuki Ichihara, Tokyo (JP); Atsushi Nakamura, Tokyo (JP); Ichiro Tamai, Kanagawa (JP); Yuzuru Hosoe, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 546 days.

(21) Appl. No.: 11/105,045

(22) Filed: Apr. 12, 2005

(65) Prior Publication Data
US 2005/0227120 A1    Oct. 13, 2005

(30) Foreign Application Priority Data
Apr. 12, 2004    (JP) .............................. 2004-117009

(51) Int. Cl.
*G11B 5/66* (2006.01)
(52) U.S. Cl. ............... 428/830; 428/831.2; 360/131
(58) Field of Classification Search ............ None
See application file for complete search history.

(56) References Cited

U.S. PATENT DOCUMENTS

| | | | | |
|---|---|---|---|---|
| 4,520,076 A * | 5/1985 | Saito et al. | ............. | 428/611 |
| 6,861,126 B2 * | 3/2005 | Fujiki | ............. | 428/212 |
| 6,894,856 B2 * | 5/2005 | Nakamura et al. | ............. | 360/55 |
| 6,936,353 B1 * | 8/2005 | Wu et al. | ............. | 428/611 |
| 7,094,483 B2 * | 8/2006 | Pelhos et al. | ............. | 428/832 |
| 7,201,977 B2 * | 4/2007 | Li et al. | ............. | 428/829 |
| 7,282,278 B1 * | 10/2007 | Nolan | ............. | 428/831.2 |
| 2005/0136290 A1 * | 6/2005 | Brucker et al. | ............. | 428/694 TM |
| 2005/0266275 A1 * | 12/2005 | Nikitin et al. | ............. | 428/831 |
| 2006/0003190 A1 * | 1/2006 | Abarra et al. | ............. | 428/832.1 |

FOREIGN PATENT DOCUMENTS

JP    2002-342908    11/2002

OTHER PUBLICATIONS

Hsu, Y., Jeong, S., Lambeth, D., Laughlin, D., IEEE Trans. Mag., 36(5), 2000, 2945-2947.*
Kai-Zhong Gao and H. Neal Bertram, "Magnetic Recording Configuration for Densities Beyond 1 Tb/in$^2$ and Data Rates Beyong 1 Gb/s", IEEE Transactions on Magnetics, vol. 38, No. 6, Nov. 2002.

* cited by examiner

*Primary Examiner*—Kevin M Bernatz
(74) *Attorney, Agent, or Firm*—Townsend and Townsend and Crew LLP; Darren Gold

(57) ABSTRACT

Embodiments of the invention provide a perpendicular magnetic recording medium capable of reconciling a high recording density with high thermal stability, and having a high write-ability while maintaining high magnetic anisotropy energy. In one embodiment, a perpendicular magnetic recording medium has a soft-magnetic underlayer, and magnetic recording layers, and the magnetic recording layers comprises a first recording layer containing magnetic grains oriented in a direction normal to a medium plane, and a second recording layer containing magnetic grains tilted in a cross-track direction. There can be provided a perpendicular magnetic recording medium resistant to thermal fluctuation, small in medium noise, and excellent in write-ability.

18 Claims, 6 Drawing Sheets

(a)  (b)

MAGNETIC RECORDING MEDIUM CONTAINING FIRST AND SECOND RECORDING LAYERS, EACH LAYER CONTAINING A COLUMNAR STRUCTURE

CROSS-REFERENCES TO RELATED APPLICATIONS

This application claims priority from Japanese Patent Application No. JP2004-117009, filed Apr. 12, 2004, the entire disclosure of which is incorporated herein by reference.

BACKGROUND OF THE INVENTION

The invention relates to a magnetic recording medium and a magnetic recording apparatus, to which a perpendicular magnetic recording technology is applied, and in particular, to a magnetic recording medium having areal recording density not less than 23.2 gigabits per one square centimeter, and a magnetic recording apparatus using the same.

With a longitudinal magnetic recording system for use in the present magnetic disk drive, there is the need for decreasing a demagnetization field in recording bits by reducing a product of remanent magnetization of a magnetic film, which is a recording medium, and the thickness of the magnetic film in order to enhance resolution. In addition, because there is the need for reducing a crystal grain size of the magnetic film in order to lower medium noise, it becomes essential to reduce the volume of magnetic grains in the magnetic film. In this connection, if the volume of the magnetic grains is reduced, magnetization of the magnetic grains fluctuates due to the effect of ambient heat, resulting in loss of recorded information, so that a problem of so-called thermal demagnetization becomes pronounced. In the past, thermal demagnetization has been suppressed by enhancing magnetic anisotropy of the magnetic film; however, it has become hard to further enhance the magnetic anisotropy of the magnetic film because of limitations to the strength of a magnetic field emanating from a recording head. Subsequently, it has been hard to attain recording density in excess of 23.2 gigabits per one square centimeter with the use of the longitudinal magnetic recording system.

Attention is being focused on a perpendicular magnetic recording system as a method for solving these problems. The perpendicular magnetic recording system is a system for forming recorded bits such that magnetization of a recording medium is effected so as to be normal to a medium plane and magnetization in the recorded bits, adjacent to each other, becomes mutually anti-parallel. With the perpendicular magnetic recording system, a demagnetization field in a magnetization transition region is small, so that a steep magnetization transition region is formed as compared with the case of the longitudinal magnetic recording system, thereby stabilizing magnetization at a high density. Accordingly, a film thickness can be increased to obtain the same resolution as compared with the case of the longitudinal magnetic recording system, thereby enabling the thermal demagnetization to be suppressed. Further, by combining a perpendicular magnetic recording medium having a perpendicular magnetic recording layer and a soft-magnetic underlayer with a single pole type recording head, a high recording field can be obtained, and material high in magnetic anisotropy can be selected for the perpendicular magnetic recording layer, enabling the thermal demagnetization to be further suppressed.

For a magnetic recording layer (magnetic layer) of the perpendicular magnetic recording medium, use of a Co—Cr—Pt base alloy film being used in the longitudinal magnetic recording medium as well, or a superlattice multilayer with Co and Pt, alternately stacked in a multitude of layers, and so forth is under study. In addition, a proposal has been made on use of a granular medium having a structure in which individual magnetic grains are magnetically isolated, and the magnetic grains columnar in shape are surrounded by a non-magnetic compound, such as an oxide, a nitride, and so forth, in order to lower medium noise. For example, in JP-A No. 342908/2002, there has been disclosed a medium obtained by adding an Si oxide containing Si in a range of 8 to 16 at. % in terms of Si atomic weight to a Co—Cr—Pt alloy.

With the perpendicular magnetic recording system as well, it is necessary to render the crystal grain size small and uniform in order to lower medium noise. Further, if the recording layer is excessively large in thickness, a recording field emanating from a head becomes small. For this reason, in order to attain a still higher recording density, the magnetic grains need be reduced in volume, thereby causing the thermal demagnetization to be pronounced. As with the longitudinal magnetic recording system, a magnetic field emanating from the head is limited, so that there are limitations to enhancement in magnetic anisotropy of the recording layer.

In order to solve this problem, a medium with an axis of easy magnetization of a recording layer, tilted in relation to a recording field, has been proposed as a means for lowering a recording field required for magnetization reversal of the recording layer. For Example, in IEEE Transactions on Magnetics, Vol. 38, No. 6, November 2002, pp. 3675-3683, "Magnetic Recording Configuration for Densities beyond 1 Tb/in$^2$", there is described a perpendicular magnetic recording medium with an axis of easy magnetization of a recording layer, tilted 45 degrees from a direction normal to a medium plane. It is described that, with the medium, as a result of the axis of the easy magnetization being tilted in relation to a recording field, a magnetic field required for magnetization reversal is considerably reduced, so that magnetic anisotropy energy of the recording layer can be considerably enhanced, thereby enabling a high recording density to be reconciled with high thermal stability.

BRIEF SUMMARY OF THE INVENTION

As described in the foregoing, with the perpendicular magnetic recording medium, by tilting the axis of easy magnetization of the magnetic recording layer from the direction normal to the medium plane, it is possible to considerably reduce the recording field as required while retaining high magnetic anisotropy energy, so that it is expected to be able to reconcile a high SNR with high thermal stability. For tilting the axis of easy magnetization, it is effective to adopt a method of forming magnetic grains in a tilted shape by restricting an incidence direction of particles at the time of forming the magnetic recording layer. In this case, however, a problem occurs to productivity due to deterioration in deposition rate. Further, as a result of the magnetic grains being tilted, an area of projection of the grains, on the medium plane, is expanded, resulting in a structure where the grains adjacent to each other are overlapped, so that there occurs a problem of deterioration in resolution in the case of the grains being tilted in a down-track direction as with the case of a conventional obliquely-vapor-deposited medium.

It is a feature of the invention to provide a magnetic recording medium capable of reconciling a high recording density with high thermal ability, and having a high write-ability while maintaining high magnetic anisotropy energy without causing deterioration in productivity and resolution.

A magnetic recording medium according to an aspect of the invention has a soft-magnetic underlayer, and magnetic recording layers, and the magnetic recording layers comprises a first recording layer containing magnetic grains oriented in a direction normal to a medium plane, and a second recording layer containing magnetic grains tilted in a cross-track direction. Further, a magnetic recording apparatus according to an aspect of the invention has the magnetic recording medium described and a single pole type recording head. As a result, the following advantageous effects can be obtained.

(1) By tilting columns of the magnetic grains contained in second recording layer and an axis of easy magnetization thereof against a direction normal to a medium plane, a high write-ability can be obtained while maintaining high thermal ability.

(2) By rendering an angle formed between a projection of the magnetic grains contained in second recording layer, on the medium plane, and the down-track direction to fall in a range of 70 to 110 degrees (in the present description, this angular range is called "the cross-track direction"), it is possible to reduce variation in length of projection of the magnetic grains, on the medium plane, in a track direction (length of an image of the magnetic grains, projected on a plane parallel with the medium plane, in a direction parallel with recording tracks). In the case where the angle formed between the projection of the magnetic grains contained in second recording layer, on the medium plane, and the down-track direction deviates from the angular range as described, there will be an increase in the length of the projection of the magnetic grains, on the medium plane, in the track direction, resulting in deterioration of resolution. Accordingly, a tilt direction of the columns is preferably the cross-track direction.

(3) By causing the first recording layer having columns of the magnetic grains, normal to the medium plane, to grow on top of, or under the second recording layer, a high write-ability can be attained while the length of the projection of the magnetic grains, on the medium plane, in the cross-track direction, is kept small. As a result, it is possible to suppress deterioration in track resolution to thereby implement high track density. In this case, an axis of easy magnetization of the first recording layer is further preferably tilted toward the cross-track direction against the direction normal to the medium plane.

(4) The first recording layer having the columns of the magnetic grains, normal to the medium plane, can be formed at a high deposition rate, so that productivity can be enhanced by reducing the thickness of the second recording layer having a lower deposition rate.

In some embodiments, the magnetic recording apparatus records information on the magnetic recording medium by the single pole type recording head. With the magnetic recording apparatus having the single pole type recording head and the soft-magnetic underlayer, it is possible to increase a variation ratio (magnetic field ingredient) of the strength of a magnetic field applied to the medium, when magnetization transition is created by combination with the medium having high write-ability, against positions on the medium. Due to a synergistic effect of such an increase in the magnetic field ingredient, and the features of the medium as described under (2) and (3) above, it is possible to create sharp magnetization transition, thereby implementing recording density in excess of 23.2 gigabits per one square centimeter, In specific embodiments, the magnetic recording apparatus has at least a single pole type recording head, a slider with the single pole type recording head mounted thereon, a suspension arm with the slider fixed thereto, and an actuator supporting the suspension arm, having a function of recording information by shifting the single pole type recording head to optional positions on a rotating magnetic recording medium in disk-like shape upon rotation of the actuator. The single pole type recording head has at least a main pole, and an auxiliary pole.

The invention can provide a perpendicular magnetic recording medium capable of having a high write-ability while maintaining high perpendicular magnetic anisotropy energy, and resistant to thermal fluctuation, small in medium noise, and excellent in write-ability.

DETAILED DESCRIPTION OF THE INVENTION

Embodiments of the invention are described hereinafter with reference to the accompanying drawings.

Figure 1:
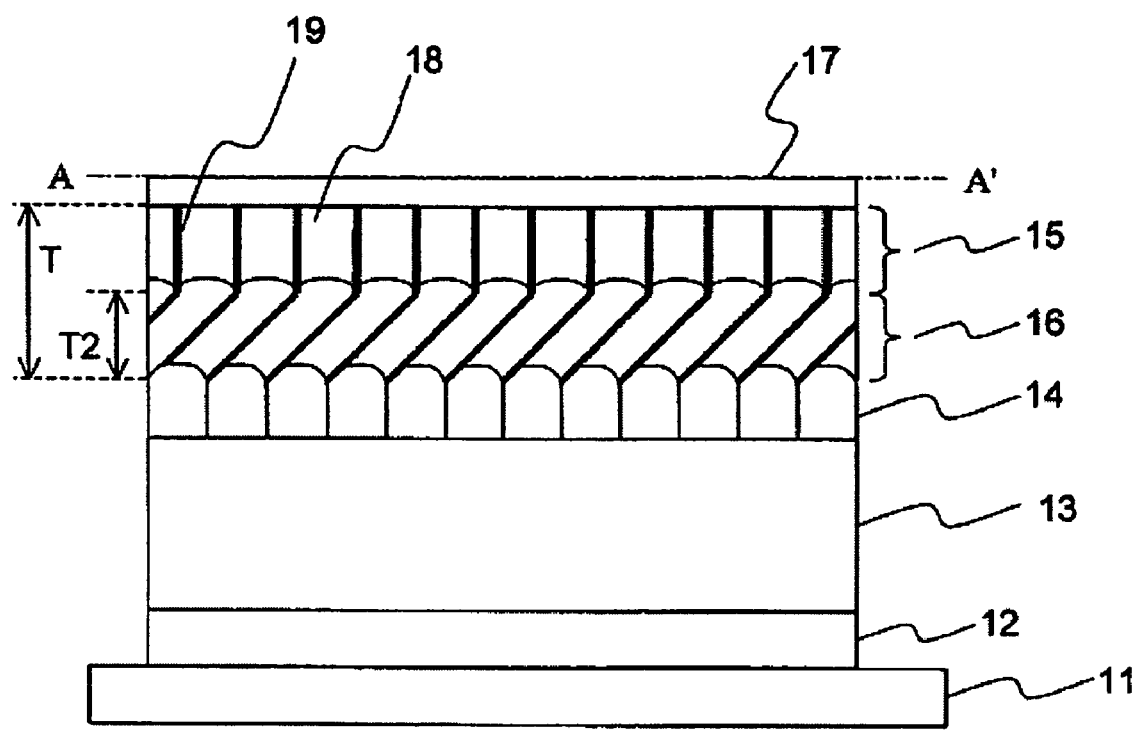
FIG. 1 is a schematic sectional diagram of one embodiment of a perpendicular magnetic recording medium according to the invention.
Figure 2:
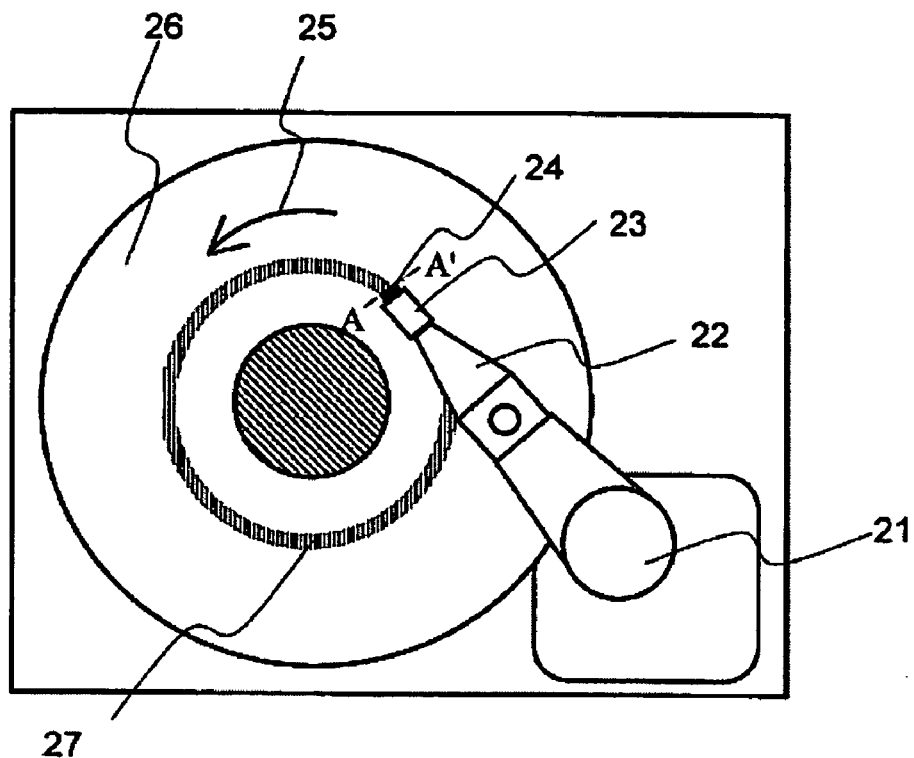
FIG. 2 is a schematic representation of a perpendicular magnetic recording apparatus according to the invention.

FIG. 1 is a schematic sectional diagram prepared based on a transmission electron microscope (TEM) image, showing a first embodiment of a perpendicular magnetic recording medium according to the invention. FIG. 2 is a schematic representation of one embodiment of a magnetic recording apparatus according to the invention.

With the magnetic recording apparatus according to the invention, a slider 23 is fixed to the tip of a suspension arm 22 supported by a rotary actuator 21. Information is recorded in, or read from a magnetic recording medium 26, rotating in a rotating direction 25 in the figure, by a magnetic head element 24 attached to an end of the slider. A single pole type recording head is used for a writer of the magnetic head element 24, and a giant magneto-resistive head is used for a reader thereof. As the rotary actuator 21 is rotated, the magnetic head element 24 is shifted to various radial positions on a disk, thereby enabling positioning thereof to be implemented. At this point in time, recording tracks 27 in concentric circles are formed on the medium.

Figure 3:
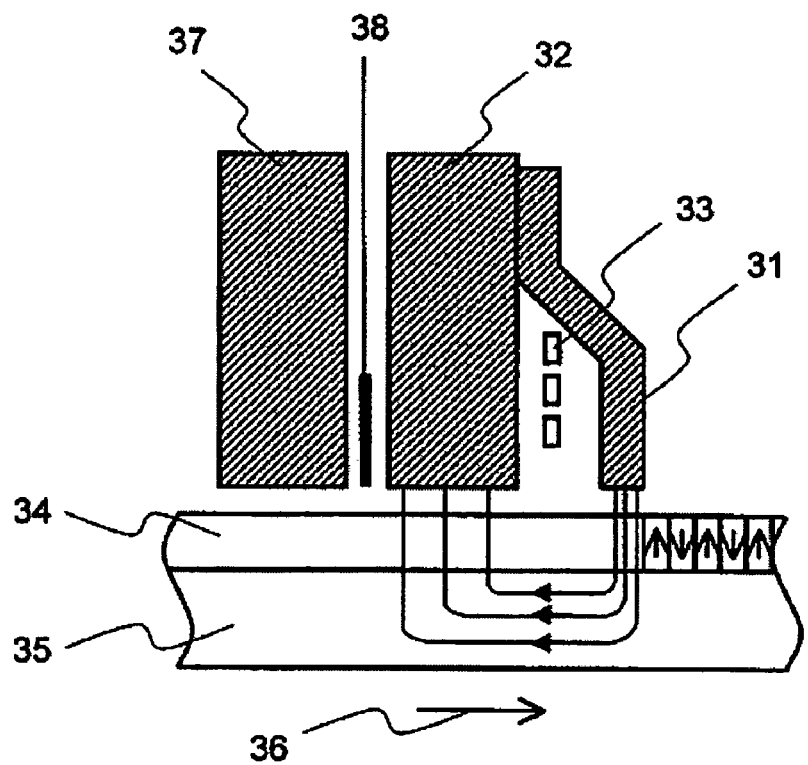
FIG. 3 is a schematic diagram showing a magnetic recording process in the perpendicular magnetic recording apparatus according to the invention.

FIG. 3 is a schematic diagram showing disposition of the heads as well as the medium in a magnetic recording process according to one embodiment of the invention. The heads comprising the writer (single pole type recording head) made up of a main pole 31, an auxiliary pole 32, and a coil 33, and the reader having a magneto-resistive element 38 sandwiched between a pair of magnetic shields 32, 37, one of which doubles as the auxiliary pole, are disposed so as to oppose the magnetic recording medium comprising a magnetic recording layer 34 and a soft-magnetic underlayer 35. Upon exciting the coil 33 by passing current therethrough, a magnetic field in the perpendicular direction is produced between the tip of the main pole 31 and the soft-magnetic underlayer 35, thereby executing recording in the magnetic recording layer 34 of the magnetic recording medium. Magnetic flux flowing into the soft-magnetic underlayer 35 returns to the auxiliary pole 32, thereby forming a magnetic circuit. The medium travels in a direction 36 by rotation, and recording is executed while the medium and the head relatively change respective positions thereof. In the strict sense, since the recording tracks are concentric circles centering around the center of the rotation of the medium, a recording track direction as described herein is meant by the direction of a tangent touching a point of the recording track, at the location thereof. Further, a cross-track direction coincides with the radial direction of the medium. A section as shown in FIG. 1 is a partly diagrammatic sectional view taken along the cross-track direction, and the direction of line A-A' of FIG. 1 corresponds to the direction of line A-A' of FIG. 2.

Figure 5:
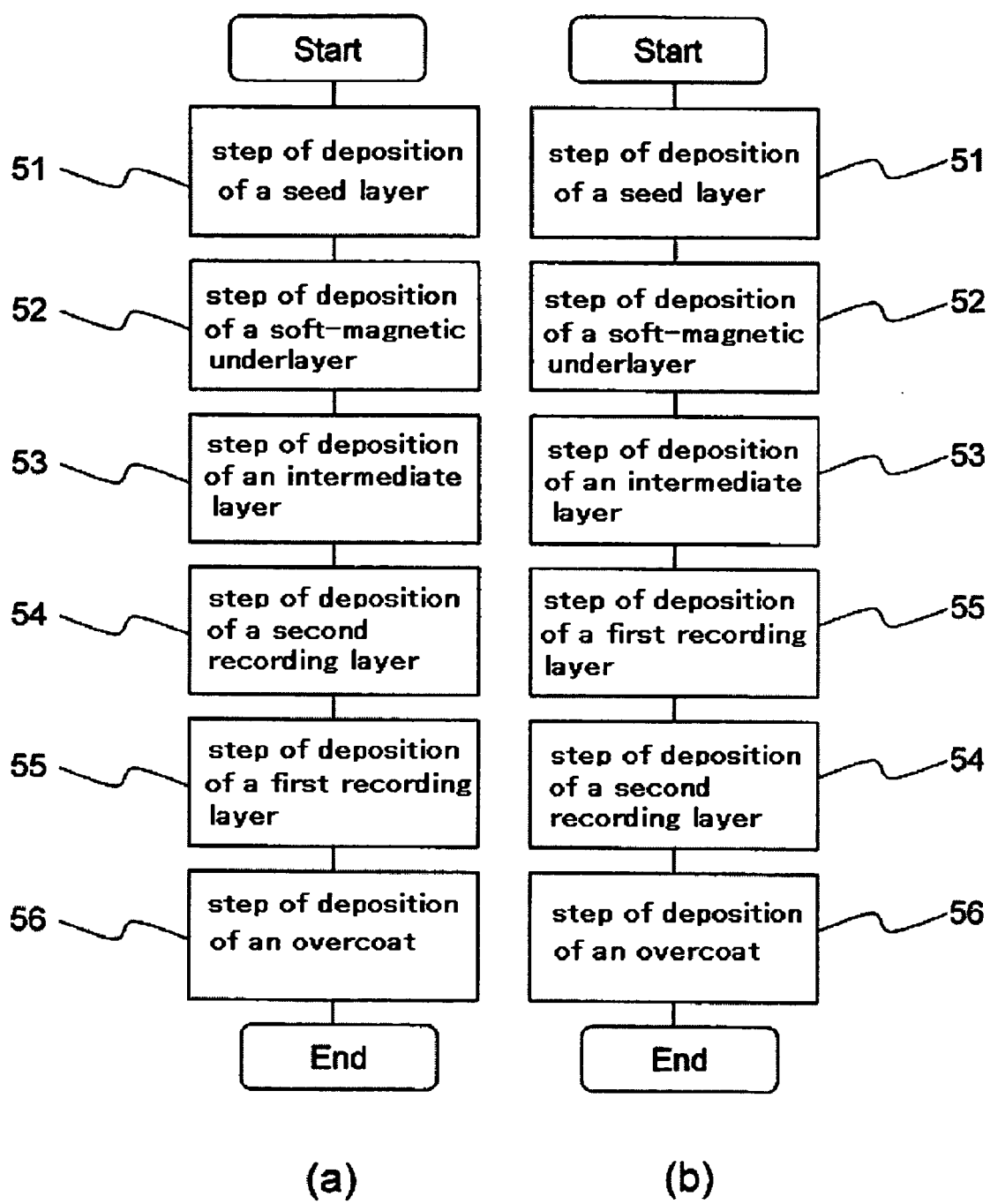
FIG. 5 shows views each showing a process of fabricating the perpendicular magnetic recording medium according to the invention.

FIG. 5(a) shows steps of fabricating respective layers of the perpendicular magnetic recording medium according to the present embodiment. Respective steps are executed by a deposition method such as a sputtering method, CVD method, and so forth, in one or a plurality of chambers for every constituent material. For a substrate 11 (refer to FIG. 1), use is made of a glass substrate 63.5 mm in diameter. As the substrate 11, use may be made of a substrate made of a metallic material, such as aluminum, and so forth, or a substrate made of a non-metallic material, such as glass, silicon, and so forth. A seed layer 12 is deposited to enhance adhesion between the substrate and a thin film. With the present embodiment, a Ni—Ta(37.5 at. %)-Zr(10 at. %) alloy layer 30 nm in thickness is formed by the sputtering method (step 51). A soft-magnetic underlayer 13 is provided to apply an intense magnetic field in the direction normal to the medium plane from the single pole type recording head, and is preferably formed of a ferro-magnetic material with saturation magnetic flux density Bs at not less than 1T, having a high permeability, such as a Co-based amorphous material, a Fe alloy material, and so forth. Further, for the purpose of improving magnetic property of the soft-magnetic underlayer 13 to thereby lower magnetic noise generated by leakage flux from the magnetic domain wall, the soft-magnetic underlayer 13 may have a multi-layer structure dividing the ferro-magnetic material through the intermediary of a non-magnetic material. With the present embodiment, as the soft-magnetic underlayer 13, a Co—Ta(3 at. %)-Zr (5 at. %) alloy layer 50 nm in thickness, a Ru layer 0.6 nm in thickness, and a Co—Ta(3 at. %)-Zr(5 at. %) alloy layer 50 nm in thickness are sequentially formed by the sputtering method (step 52).

An intermediate layer 14 is intended to align crystallographic orientation of a second recording layer 16 while interrupting magnetic exchange interaction between the second recording layer 16 and the soft-magnetic underlayer 13, and also, to adjust the magnetic anisotropy of the second recording layer 16 by promoting formation of a column structure of magnetic grains in the second recording layer 16. As a constituent material of the second recording layer 16, selection may be made of a non-magnetic material of amorphous structure, hexagonal closed pack lattice structure, or face-centered cubic lattice structure; however, use is preferably made of a metal, such as Ru, Ti, Hf, and so forth, showing high (0001) orientation, and having the effect of enhancing the crystallographic orientation of the second recording layer 16, or an alloy containing the metal. Further, by forming the intermediate layer 14 so as to have a column structure, and a structure having a surface with pits and projections each in a range of 5 to 10 mn in circumference, it becomes possible to promote formation of a column structure of the second recording layer 16, described later on. Further, the intermediate layer 14 may be formed so as to have a multi-layer structure composed of combination of constituent materials having different surface free energies, such as, for example, MgO and Pd, thereby forming a surface with pits and projections through island growth of a surface layer. With the present embodiment, as the intermediate layer 14, a Ta layer 1 nm in thickness, and a Ru layer 20 nm in thickness are sequentially formed (step 53).

Figure 4:
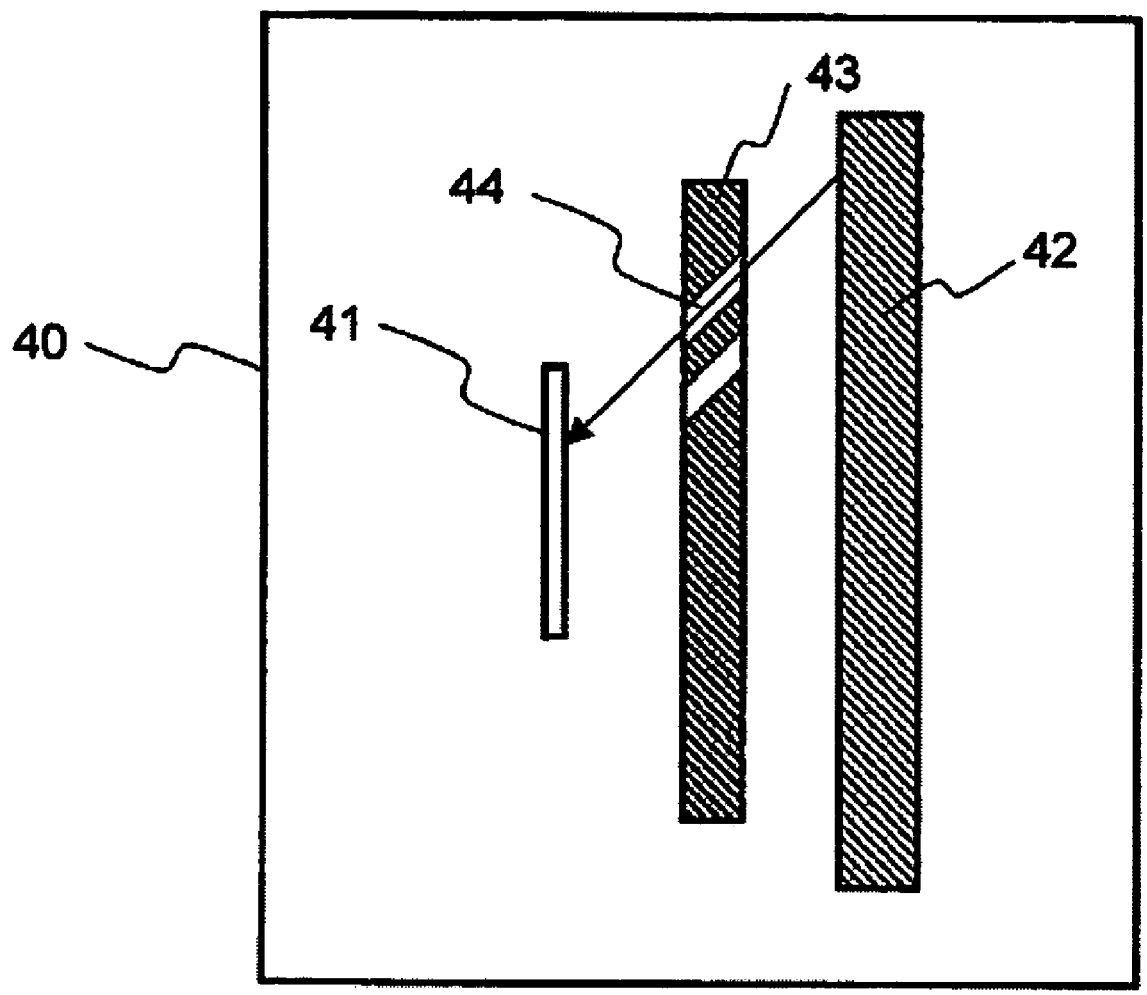
FIG. 4 is a schematic representation of a sputtering apparatus for forming a second recording layer

A first recording layer 15 and the second recording layer 16 are formed by the sputtering method using a target made of a Co—Cr—Pt alloy and an Si oxide (steps 54, 55). Now, one embodiment of the step 54 for forming the second recording layer 16 is described hereinafter. A sputtering apparatus 40 shown in FIG. 4 is for forming the second recording layer 16 on a substrate 41, and is provided with a sputtering target 42 for ejecting sputtered particles, and a shade plate 43 for restricting an incidence direction of the sputtered particles to a specific direction. The sputtering target 42 is made of constituent materials of a layer to be formed, and is formed in the shape of a disk. The shade plate 43 has sputtered particle through-holes 44, and is positioned between the substrate 41 and the sputtering target 42. The shape of each of the sputtered particle through-holes 44 is set such that an incident angle of the sputtered particles becomes about 45 degrees when the sputtered particles ejected from the sputtering target 42 are deposited on the substrate 41. Thus by restricting an incidence direction of the sputtered particles, there is formed the second recording layer 16 having a column structure with respective non-magnetic grain boundaries 19 of an oxide, and so forth, surrounding around magnetic grains 18 having grown tracing the pits and projections of the surface of the intermediate layer 14, respective columns being in such a state as tilted in the radial direction. In this case, even if a direction of easy magnetization of magnetic grain crystals in the second recording layer 16 is normal to the medium plane, the direction of easy magnetization of the second recording layer 16 is tilted toward the tilt direction of the columns due to shape anisotropy of the columns. However, by adjusting lattice spacing as well as crystallographic orientation of the surface of the intermediate layer 14, a crystallographic plane of the second recording layer 16 may be tilted in the cross-track direction. In FIG. 1, there is shown an example where the second recording layer 16 is tilted toward the outer side of the substrate, in the cross-track direction, but by changing the shape of each of the sputtered particle through-holes 44, the second recording layer 16 may be tilted toward the inner side of the substrate.

The first recording layer 15 is deposited by the normal sputtering method without the use of the shade plate 43 such that a growth direction of columns of the magnetic grains coincides with the direction normal to the medium plane. In this connection, by tilting the crystallographic plane of the second recording layer 16 toward the tilt direction of the columns, and tilting a crystallographic plane of the first recording layer 15 toward the tilt direction of the columns of the second recording layer 16 by utilizing an epitaxy effect, it becomes possible to tilt an axis of easy magnetization of the first recording layer 15 as well.

As an overcoat 17, a carbon layer 4 nm in thickness is formed by the sputtering method (step 56). As a constituent material of the overcoat 17, use may be made of a public known material including carbon nitride, silicon, silicon nitride, and so forth. The thickness of the overcoat 17 is preferably in a range of about 2 to 10 nm from the viewpoint of flyability, corrosion resistance of the medium, magnetic spacing, and so forth.

With reference to the perpendicular magnetic recording medium shown in FIG. 1, the columns of the second recording layer 16 were tilted at 45 degrees to the direction normal to the medium plane, thickness T of all the magnetic recording layers was fixed at 20 nm, and thickness T2 of the second recording layer 16 was varied. In that case, variations in respect of a required field for magnetization reversal, SNR, SNR's dependence on linear recording density, areal recording density estimated from off-track characteristics, and duration of deposition of all the magnetic recording layers are shown in Table 1. In this case, a medium in the case of T2/T being O, that is, a medium wherein columns are perpendicular throughout the thickness of magnetic recording layers as with the conventional perpendicular magnetic recording medium is referred to as Comparison 1 while a medium in the case of T2/T being 1, that is, a medium wherein columns are tilted throughout the thickness of magnetic recording layers is referred to as Comparison 2.

tered particles is restricted by use of the shade plate 43, as shown in FIG. 4, and so forth. The deposition rate of the second recording layer 16 varies depending on the shape of the shade plate, and a deposition condition; however, in this case, the deposition rate of the first recording layer 15 was set to 5 nm per second, and the deposition rate of the second recording layer 16 was set to 1 nm per second.

As shown in Table 1, while with the medium according to Comparison 1, the required field was as high as 819 kA/m, with the present embodiment, a head magnetic field was insufficient, but as a ratio of T2 to T increases, so the required field decreases accordingly, resulting in improvement on SNR accordingly. This is deemed due to the fact that tilting of the axis of easy magnetization of the second recording layer 16 facilitates magnetization reversal, thereby assisting the first recording layer 15 to undergo magnetization reversal. Further, with the medium according to the present embodiment, because of the effect of the hcp (0002) face of the second recording layer 16 tilting in relation to the medium plane when the second recording layer 16 was formed, the hcp (0002) face of the first recording layer 15 was tilted at 5 to 10 degrees in relation to the medium plane. It is inferred that this caused the axis of easy magnetization of the first recording layer 15 to be tilted toward the direction normal to

TABLE 1

|  | T2/T | Required Field (kA/m) | SNR (dB) | Liner Density (kbits/mm) | Track Density (tracks/mm) | Arial Density (Gbits/mm$^2$) | Duration of Deposition (second) | Defects (number/surface) |
| --- | --- | --- | --- | --- | --- | --- | --- | --- |
| Embodiment | 0.1 | 756 | 19.8 | 39.4 | 6067 | 23.9 | 5.6 | 21 |
|  | 0.2 | 702 | 20.3 | 42.5 | 5995 | 25.5 | 7.2 | 35 |
|  | 0.3 | 654 | 20.8 | 45.7 | 5924 | 27.1 | 8.8 | 52 |
|  | 0.4 | 611 | 21.1 | 47.6 | 5854 | 27.8 | 10.4 | 45 |
|  | 0.5 | 573 | 21.3 | 48.8 | 5787 | 28.3 | 12.0 | 38 |
|  | 0.6 | 560 | 21.4 | 49.2 | 5721 | 28.2 | 13.6 | 67 |
|  | 0.7 | 550 | 21.4 | 49.6 | 5656 | 28.1 | 15.2 | 80 |
|  | 0.8 | 542 | 21.4 | 50.0 | 5593 | 28.0 | 16.8 | 132 |
|  | 0.9 | 535 | 21.5 | 50.2 | 5531 | 27.8 | 18.4 | 196 |
| Comparison 1 | 0 | 819 | 19.3 | 36.3 | 6142 | 22.3 | 4.0 | 34 |
| Comparison 2 | 1 | 528 | 21.5 | 50.5 | 5471 | 27.6 | 20.0 | 227 |

The required field for magnetization reversal was defined as a magnetic field where reproducing output reaches 80% of a saturation value when recording at 6.41 kfr/mm. Magnetic grains in the magnetic recording layers were 12.7 nm in average grain size, magnetic anisotropy constant was $1.3 \times 10^5$ J/m$^3$, saturation magnetization was 0.314 T, the thickness of the soft-magnetic underlayer was 100 nm, saturation magnetic flux density of the soft-magnetic underlayer was 1.3 T, relative permeability of the soft-magnetic underlayer was 500, the main pole of the single pole type recording head was 110 nm in width, the main pole was 150 nm in thickness, the main pole had saturation magnetic flux density at 2.4 T, a magnetic spacing between the head and medium was 13 nm, and relative speed between the head and medium was 20 m per second. Low density recording with a bit length of 152 nm, and high density recording with a bit length of 38 nm were executed to thereby find a SNR expressing a ratio of resolution representing a percentage of high density output against low density output to the low density output against high density noise in terms of dB. Head magnetic field strength was 653 kA/m.

In general, a deposition rate of the second recording layer 16 is lower as compared with a deposition rate of the first recording layer 15 since the incidence direction of the sputtered the medium plane, thereby decreasing further the required field. A ratio of the low density output after the passage of ten years from recording, as estimated from variation of the low density output over time, to the low density output immediately after recording, was found substantially constant at 81% in each case regardless of a value of T2.

Meanwhile, as a T2 ratio increases, so the track density decreases, and upon a ratio of T2 to T exceeding 0.5, the areal density starts decreasing. This is attributable to an increase in length of projection on the medium plane, in the cross-track direction, as a result of an increase of T2. Further, as a ratio of the second recording layer 16 becomes larger, so duration of deposition becomes longer, resulting in deterioration of productivity. Further, upon the ratio of T2 to T exceeding 0.7, the number of defects in the medium increased rapidly, exceeding 100 pieces per a disk face, which is the maximum permissible value. It is deemed that this is due to accentuation of the pits and projections in the surface of the medium because of a shadowing effect at the time of the sputtering from an oblique direction, resulting in an increase in the number of abnormal growth regions. From the above viewpoint, the ratio of the thickness T2 of the second recording layer 16 to the thickness T of the perpendicular magnetic recording layers, that is, T2/T is preferably in a range of about 0.1 to 0.7. More specifically, if T2/T is less than about 0.1, the advantageous effect of an increase in the areal density as compared with the case of the conventional medium according to Comparison 1 is small, and if T2/T is in excess of about 0.7, the number of the defects increases, which is not desirable.

Subsequently, by adjusting the shape of the sputtered particle through-holes 44 in the shade plate 43, a medium having a second recording layer 16 with columns varied in tilt angle was fabricated. In Table 2, there is shown SNR of the medium wherein, with T2/T kept constant at 0.4, the tilt angle of the columns of the second recording layer 16, in relation to the direction normal to the medium plane, was varied. In this case, angles formed between respective magnetic grain portions and the normal to the medium plane were found from a TEM image on the medium in section, and an average value of the angles was adopted as a tilt angle. With the medium according to Comparison 1, shown in Table 1, improvement on SNR was observed when the title angle was 10 degrees and upward, but in the case of the medium with the tilt angle at 70 degrees, SNR was deteriorated abruptly. It is deemed that this is because it became difficult to separate magnetic grains from respective non-magnetic grain boundaries due to restriction of the incidence angle of the sputtered particles at the time of deposition. Based on the above results, advantageous effects of the invention can be observed with the tilt of the second recording layer 16 in a range of about 10 to 60 degrees, and further, the tilt of the second recording layer 16 is preferably in a range of about 30 to 50 degrees.

TABLE 2

| Tilt Angle (deg.) | SNR (dB) |
| --- | --- |
| 10 | 20.0 |
| 30 | 20.4 |
| 45 | 21.1 |
| 60 | 20.8 |
| 70 | 17.5 |

Figure 6:
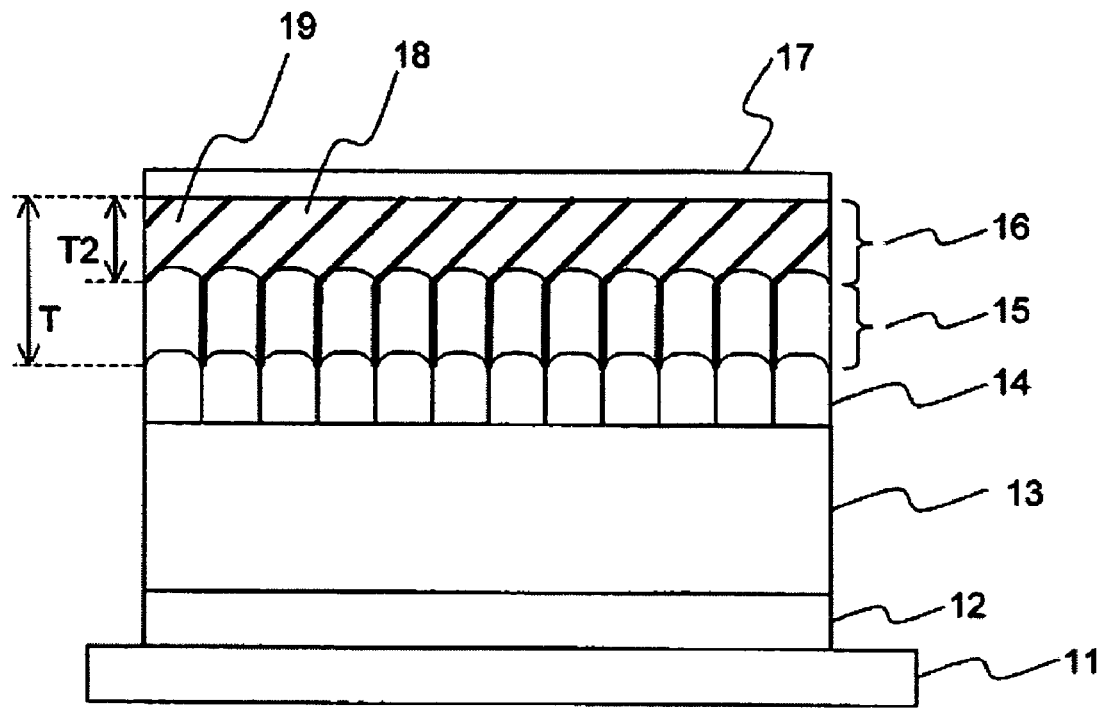
FIG. 6 is a schematic sectional diagram of another embodiment of a perpendicular magnetic recording medium according to the invention.

FIG. 6 is a schematic sectional diagram of a medium, prepared based on a TEM image, showing a second embodiment of a magnetic recording medium according to the invention. In the figure, parts in common with those for the first embodiment are denoted by like reference numerals. FIG. 5(b) shows steps of fabricating the medium. The steps of fabricating the medium according to the present embodiment differs from the steps of fabricating the medium according to the first embodiment only in that the order in which a step 55 of deposition of a first recording layer, and a step 54 of deposition of a second recording layer are executed is reversed from the order in which those steps are executed for the first embodiment. Process contents in respective steps 51 to 56 are the same as those for the first embodiment.

Over a non-magnetic substrate 11, there are sequentially deposited a seed layer 12 for enhancing adhesion with the substrate, a soft-magnetic underlayer 13, an intermediate layer 14, a first recording layer 15, a second recording layer 16, and an overcoat 17. As a result of a surface of the first recording layer 15, tracing pits and projections in a surface of the intermediate layer 14, the respective layers can be fabricated as with the case of the medium according to the first embodiment. Even in the case of providing the second recording layer 16 with tilted columns, on the surface side of the medium, the same advantageous effects as those for the first embodiment can be obtained.

Figure 7:
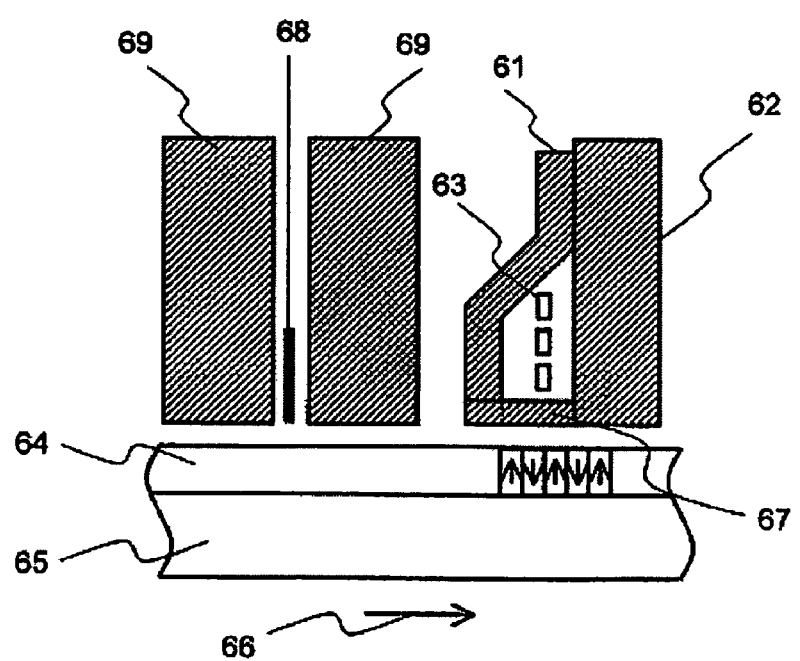
FIG. 7 is a schematic sectional representation of another embodiment of a perpendicular magnetic recording apparatus according to the invention.
Figure 8:
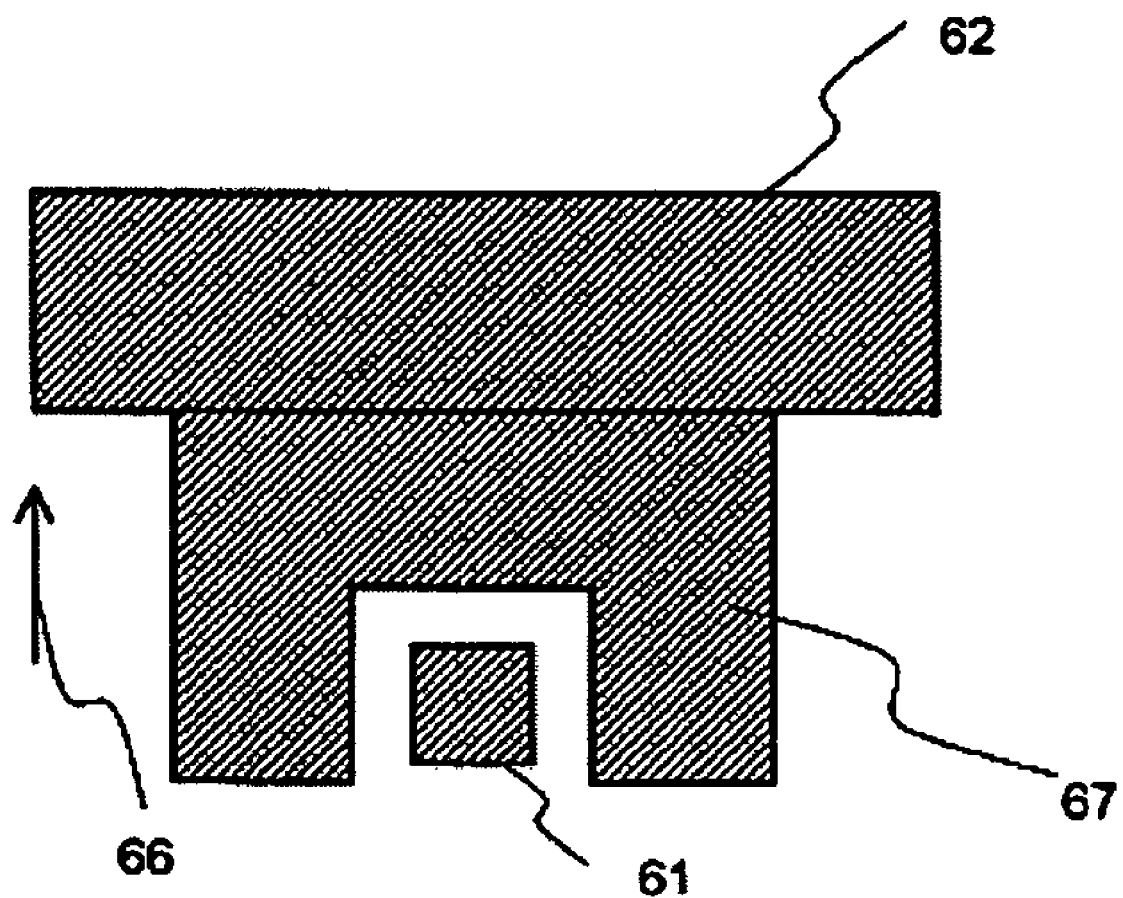
FIG. 8 is a schematic diagram showing a layout of the poles of a single pole type recording head, as seen from the levitation plane thereof.

With a magnetic recording apparatus using the same magnetic recording medium as that according to the first embodiment, recording and reading heads of a construction, shown in a schematic diagram of FIG. 7, are used for heads. More specifically, the heads comprising a writer made up of a main pole 61, an auxiliary pole 62, and a coil 63, and a reader of a construction having a magneto-resistive element 68, sandwiched between a pair of magnetic shields 69, 69, are disposed so as to oppose the magnetic recording medium comprising a magnetic recording layer 64 and a soft-magnetic underlayer 65. Now, unlike the case of the first embodiment, the auxiliary pole 62 is disposed on the downstream side of a medium traveling direction 66, in relation to the main pole 61. Further, there is provided a magnetic shield 67 made up of a soft-magnetic thin film, connected to the auxiliary pole 62 and extended up to the vicinity of the main pole 61. FIG. 8 is a schematic diagram showing a layout of the poles of magnetic heads, as seen from the air bearing surface (ABS) of the magnetic heads.

With the heads according to the present embodiment, while a magnetic field gradient increases due to the effect of the shield 67 being in the vicinity of the main pole 61 to thereby reduce a recording track width, a head magnetic field strength is decreased. When spacing between the shield 67 and the main pole 61 was 100 nm in both a track direction and a track width direction, the magnetic field gradient increased by 50% and the recording track width decreased by 15% as compared with the heads according to the first embodiment, but a recording field decreased to 550 kA/m. Accordingly, in contrast to the conventional medium according to Comparison 1, shown in Table 1, where SNR considerably deteriorated to 19.3 dB, with the medium with T2/T at 0.4, according to the first embodiment, shown in Table 1, SNR at 21.1 dB was obtained. Consequently, although recording was found difficult with the heads in combination with the conventional magnetic recording medium, it has become possible to implement high density recording with the heads in combination with the medium according to the invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic recording medium having a soft-magnetic underlayer, magnetic recording layers for recording information, and an intermediate layer having at least one layer, formed between the soft-magnetic underlayer, and the magnetic recording layers, the magnetic recording layers comprising:
a first recording layer and a second recording layer, each containing ferro-magnetic grains to form a column structure, wherein the first recording layer has columns oriented and coinciding with a direction normal to a medium plane of the medium, and a second recording layer has columns tilted in a cross-track direction with respect to the medium plane.

2. A magnetic recording medium according to claim 1 wherein an angle formed between each of the columns of the second recording layer and the direction normal to the medium plane, is about 10 degrees or more and less than about 60 degrees.

3. A magnetic recording medium according to claim 1, wherein at least one layer of the intermediate layer contains grains forming a column structure, the second recording layer is formed so as to be in contact with the layer containing the grains forming the column structure, and the first recording layer is formed on top of the second recording layer.

4. A magnetic recording medium according to claim 1, wherein at least one layer of the intermediate layer contains grains forming a column structure, the first recording layer is formed so as to be in contact with the layer containing the grains forming the column structure, and the second recording layer is formed on top of the first recording layer.

5. A magnetic recording medium according to claim 1, wherein at least one layer of the intermediate layer has an island structure, the second recording layer is formed on top of the intermediate layer, and the first recording layer is formed on top of the second recording layer.

6. A magnetic recording medium according to claim 1, wherein at least one layer of the intermediate layer has an island structure, the first recording layer is formed on top of the intermediate layer, and the second recording layer is formed on top of the first recording layer.

7. A magnetic recording medium according to claim 1, wherein an axis of easy magnetization of the first recording layer is tilted in the cross-track direction, and an angle formed between the axis of the easy magnetization and the direction normal to the medium plane is about 5 degrees or more and less than about 60 degrees.

8. A magnetic recording medium according to claim 1, wherein the intermediate layer contains a metal of a hexagonal closed pack lattice structure, or an alloy of the metal.

9. A magnetic recording medium according to claim 1, wherein assuming that the sum of the thickness of the first recording layer and the thickness of the second recording layer is T and the thickness of the second recording layer is T2, T2/T is in a range of about 0.1 to about 0.7.

10. A magnetic recording apparatus having:
a magnetic recording medium;
a single pole type recording head;
a slider with the single pole type recording head mounted thereon;
a suspension arm with the slider fixed thereto; and
an actuator supporting the suspension arm, said magnetic recording medium having a soft-magnetic underlayer, magnetic recording layers for recording information, and an intermediate layer having at least one layer, formed between the soft-magnetic underlayer and the magnetic recording layers, said magnetic recording layers comprising:
a first recording layer and a second recording layer, each containing ferro-magnetic grains to form a column structure, wherein the first recording layer has columns oriented and coinciding with a direction normal to a medium plane of the medium, and a second recording layer has columns tilted in a cross-track direction with respect to the medium plane.

11. A magnetic recording apparatus according to claim 10, wherein an angle formed between each of the columns of the second recording layer and the direction normal to the medium plane, is about 10 degrees or more and less than about 60 degrees.

12. A magnetic recording apparatus according to claim 10, wherein at least one layer of the intermediate layer contains grains forming a column structure, the second recording layer is formed so as to be in contact with the layer containing the grains forming the column structure, and the first recording layer is formed on top of the second recording layer.

13. A magnetic recording apparatus according to claim 10, wherein at least one layer of the intermediate layer contains grains forming a column structure, the first recording layer is formed so as to be in contact with the layer containing the grains forming the column structure, and the second recording layer is formed on top of the first recording layer.

14. A magnetic recording apparatus according to claim 10, wherein at least one layer of the intermediate layer has an island structure, the second recording layer is formed on top of the intermediate layer, and the first recording layer is formed on top of the second recording layer.

15. A magnetic recording apparatus according to claim 10, wherein at least one layer of the intermediate layer has an island structure, the first recording layer is formed on top of the intermediate layer, and the second recording layer is formed on top of the first recording layer.

16. A magnetic recording apparatus according to claim 10, wherein an axis of easy magnetization of the first recording layer is tilted in the cross-track direction, and an angle formed between the axis of the easy magnetization and the direction normal to the medium plane is about 5 degrees or more and less than about 60 degrees.

17. a magnetic recording apparatus according to claim 10, wherein the intermediate layer contains a metal of a hexagonal closed pack lattice structure, or an alloy of the metal.

18. A magnetic recording apparatus according to claim 10, wherein assuming that the sum of the thickness of the first recording layer and the thickness of the second recording layer is T and the thickness of the second recording layer is T2, T2/T is in a range of about 0.1 to about 0.7.

* * * * *

UNITED STATES PATENT AND TRADEMARK OFFICE
CERTIFICATE OF CORRECTION

PATENT NO. : 7,556,871 B2
APPLICATION NO. : 11/105045
DATED : July 7, 2009
INVENTOR(S) : Ichihara et al.

It is certified that error appears in the above-identified patent and that said Letters Patent is hereby corrected as shown below:

<u>In the Claims:</u>

Claim 2, column 10, line 57, please delete "to claim 1 wherein" and insert -- to claim 1, wherein --

<u>In the Detailed Description:</u>

Column 6, line 5, please delete "10 mn" and insert -- 10 nm --

Column 9, line 19, please delete "tilt" and insert -- title --

Signed and Sealed this

Twentieth Day of October, 2009

David J. Kappos
*Director of the United States Patent and Trademark Office*